(12) United States Patent
Johnson et al.

(10) Patent No.: US 6,775,271 B1
(45) Date of Patent: Aug. 10, 2004

(54) SWITCHING SYSTEM AND METHOD FOR COMMUNICATING INFORMATION AT A CUSTOMER PREMISES

(75) Inventors: Brian W. Johnson, Lucas, TX (US); K. Arlan Harris, Coppell, TX (US); Gregory E. Geiger, Plano, TX (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 09/662,733

(22) Filed: Sep. 15, 2000

Related U.S. Application Data

(60) Provisional application No. 60/204,898, filed on May 17, 2000.

(51) Int. Cl.$^7$ .............................................. H04L 12/66
(52) U.S. Cl. ..................... 370/352; 370/401; 370/466
(58) Field of Search ................................ 370/352, 466, 370/395.1, 395.6, 395.61, 395.63, 395.64, 395.65, 401

(56) References Cited

U.S. PATENT DOCUMENTS

| | | | | |
|---|---|---|---|---|
| 5,898,668 A | * | 4/1999 | Shaffer ........................ | 370/230 |
| 6,075,784 A | * | 6/2000 | Frankel et al. ............... | 370/356 |
| 6,081,517 A | * | 6/2000 | Liu et al. ..................... | 370/352 |
| 6,243,377 B1 | * | 6/2001 | Phillips et al. ............... | 370/354 |
| 6,252,878 B1 | * | 6/2001 | Locklear et al. ............. | 370/401 |
| 6,282,207 B1 | * | 8/2001 | Lerman et al. .............. | 370/470 |
| 6,285,671 B1 | * | 9/2001 | Bossemeyer et al. ........ | 370/352 |
| 6,385,203 B2 | * | 5/2002 | McHale et al. .............. | 370/352 |
| 6,400,708 B1 | * | 6/2002 | Bartholomew et al. ...... | 370/352 |
| 6,466,573 B1 | * | 10/2002 | Renucci ....................... | 370/352 |
| 6,490,273 B1 | * | 12/2002 | DeNap et al. ............... | 370/352 |
| 2003/0185152 A1 | * | 10/2003 | Nederveen et al. ......... | 370/229 |

* cited by examiner

*Primary Examiner*—Chau Nguyen
*Assistant Examiner*—Christine Ng
(74) *Attorney, Agent, or Firm*—Blakely, Sokoloff, Taylor & Zafman LLP

(57) ABSTRACT

A switching system (14) at a customer premises communicates information associated with one or more subscribers. The switching system (14) includes multiple subscriber line ports (17) for communicating xDSL signals with subscribers, the xDSL signals containing both data signals and POTS voice signals. A logical port (20) communicates data signals and packetized voice signals from the subscribers with a central office, the switching system (14) converting between the POTS voice signals of the subscriber lines (16) and the packetized voice signals of the logical port (20). A LAN port (21) communicates data signals with a server complex (23) using a LAN (22) to provide data services to the subscribers. The switching system (14) may include a switch (32) that receives voice signals on a first virtual circuit (VC), switches the voice signals out of the switching system (14) on the first VC, and also communicates received data signals for routing. A router (32) within the switching system (14) may receive the data signals from the switch (32) on a second VC, determine a third VC for the data signals, and route the data signals to the switch (32) on the third VC for communication out of the switching system (14) on the third VC.

46 Claims, 7 Drawing Sheets

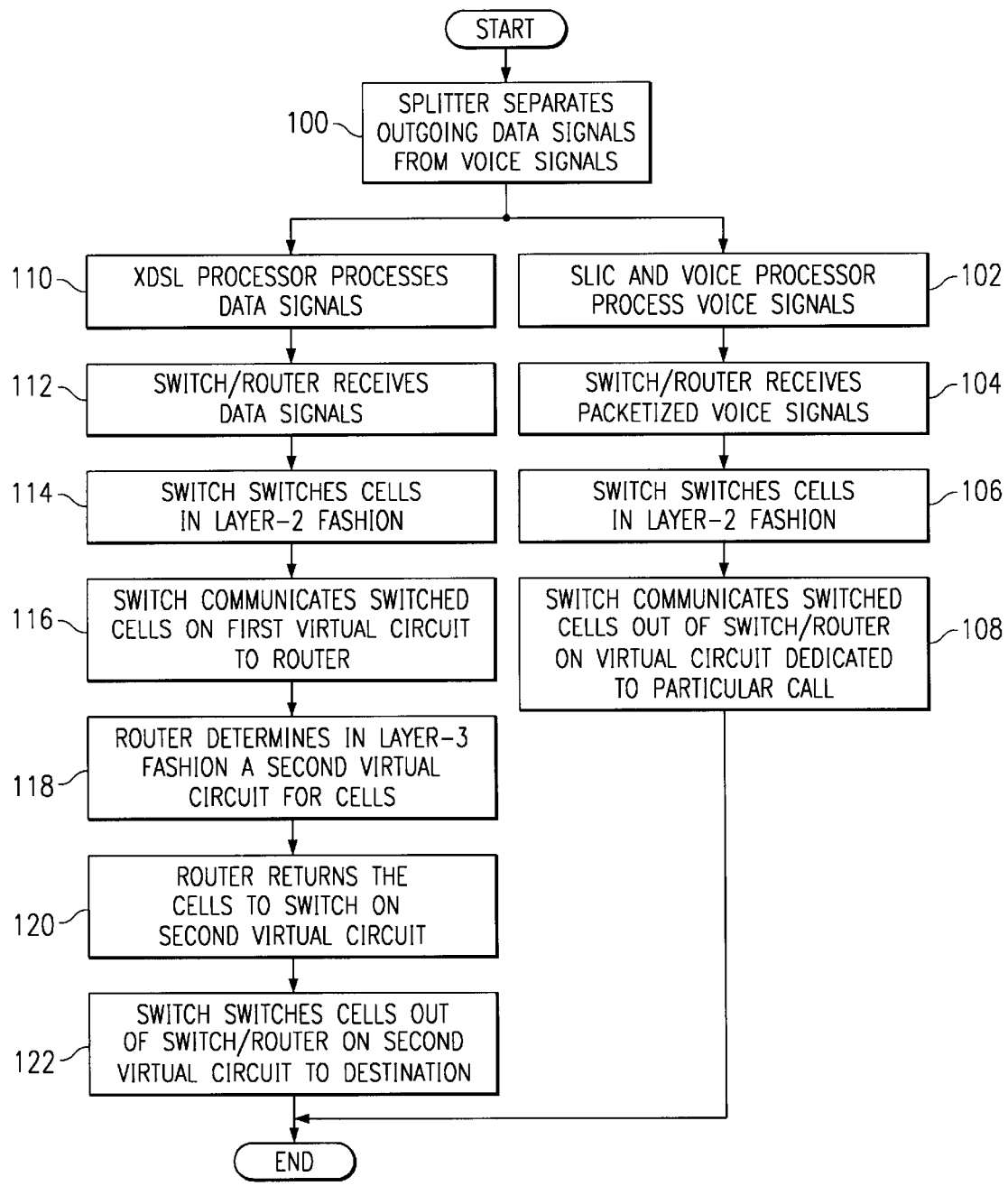

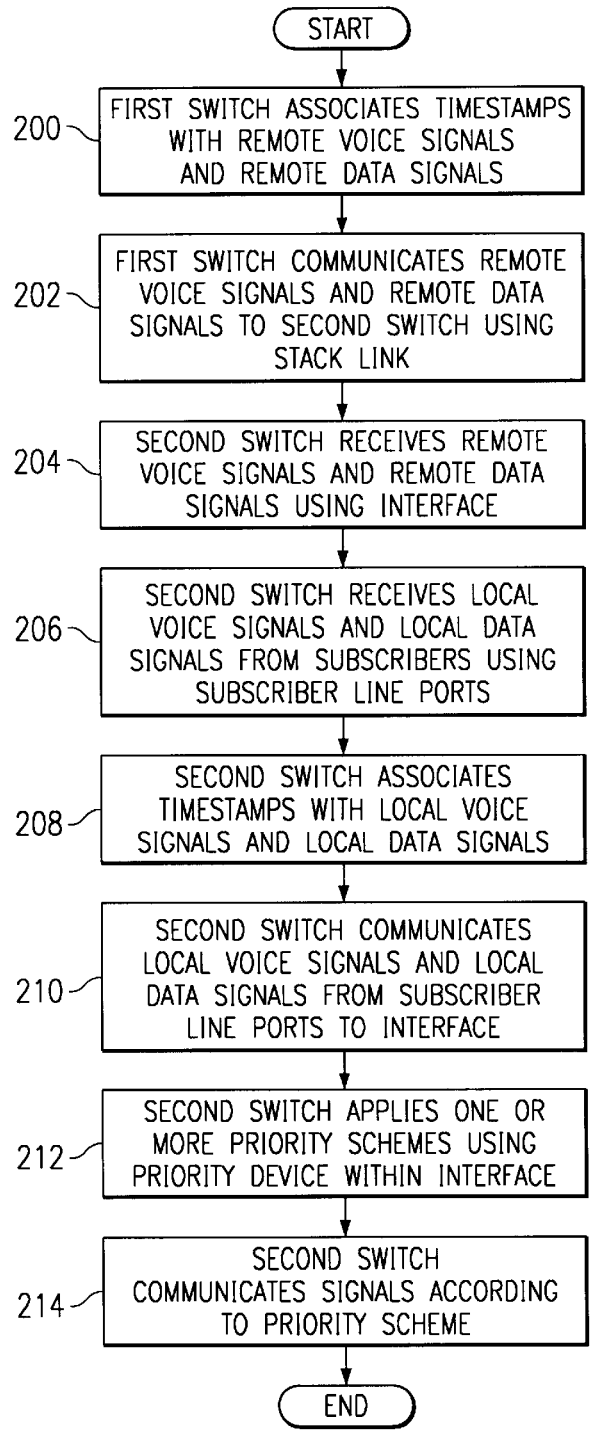
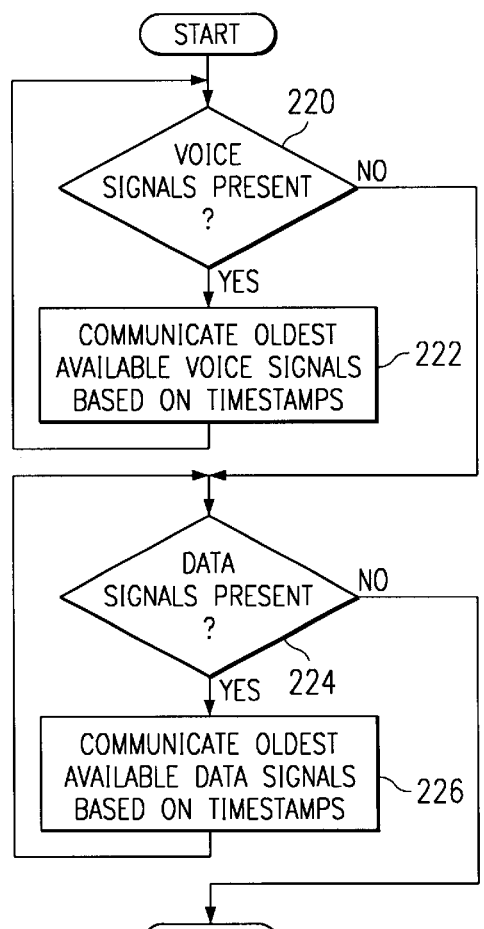
FIG. 8
FIG. 9A

SWITCHING SYSTEM AND METHOD FOR COMMUNICATING INFORMATION AT A CUSTOMER PREMISES

RELATED APPLICATIONS

This application claims the benefit of U.S. Provisional Patent Application No. 60/204,898, filed on May 17, 2000.

This application is related to:

U.S. application Ser. No. 09/663,391, filed Sep. 15, 2000 by Brian W. Johnson, K. Arlan Harris, and Manlio D. Marquez, for a System and Method for Prioritizing and Communicating Subscriber Voice and Data Information; and U.S. application Ser. No. 09/662,734 filed Sep. 15, 2000 by Brian W. Johnson, for a System and Method for Communicating Information Using Inverse Multiplex ATM (IMA) Functionality.

TECHNICAL FIELD OF THE INVENTION

This invention relates in general to the field of communications and in particular to a switching system and method for communicating information at a customer premises.

BACKGROUND OF THE INVENTION

Historically, voice, video, data, and other services have been provided separately, using multiple facilities and separate wiring. As a result, communities requiring such services have usually faced relatively large initial expenses for implementing a system, subsequently increasing system capacity, and maintaining the system on an ongoing basis. Attempts to integrate such services to offset these inadequacies have typically forced users in these communities to accept a number of undesirable limitations, for example, limitations as to the generality of data services available.

Communications needs continue to expand on a global scale. With the growing demand for communications, and despite the limitations associated with prior systems, there is a concurrent expansion in the demand for audio, video, data, and other services provided to user communities. This is particularly true considering the recent rise in importance of packet-based audio, video, data, and other communications that rely on Asynchronous Transfer Mode (ATM), Internet Protocol (IP), Frame Relay (FR), and other packet-based protocols. For example, users in a community such as an apartment complex or other shared tenant environment may have telephones, personal computers, facsimile machines, and other devices allowing them to interface to the public switched telephone network (PSTN), the Internet, and other suitable networks. Previous systems do not provide voice, video, data, and other services in an integrated manner using a system having relatively low implementation, scaling, and ongoing maintenance costs. As a result of these and other inadequacies, previous systems are often inadequate to address the current and future needs of many user communities.

SUMMARY OF THE INVENTION

According to the present invention, disadvantages and problems associated with previous switching systems and methods are substantially reduced or eliminated.

According to one embodiment of the present invention, a switching system at a customer premises communicates information associated with one or more subscribers. The switching system includes a switch that receives voice signals on a first virtual circuit (VC) and switches the voice signals out of the switching system on the first VC. The switch also communicates received data signals for routing. A router of the switching system receives the data signals from the switch on a second VC, determines a third VC for the data signals, and routes the data signals to the switch on the third VC for communication out of the switching system on the third VC.

In another embodiment of the present invention, a switching system at a customer premises communicates information associated with one or more subscribers. The switching system includes a local area network (LAN) port for communicating data signals with a server complex using a LAN to provide one or more data services accessible to some or all subscribers, a logical port for communicating data signals and packetized voice signals with a central office (CO), and multiple subscriber line ports for communicating digital subscriber line (xDSL) signals with subscribers. The switching system is able to communicate data signals and plain old telephone service (POTS) voice signals between subscribers using the subscriber line ports. The switching system also communicates data signals and POTS voice signals between subscribers and the CO using the subscriber line ports and the logical port, the switching system converting between the POTS voice signals of the subscriber lines and the packetized voice signals of the logical port. The switching system also communicates data signals between subscribers and the server complex using the LAN port.

The present invention provides a number of important technical advantages over previous systems and methods. Unlike previous systems, the switching system of the present invention can be provisioned to include a single logical data link from the switching system to the CO site. This link bidirectionally carries data, packetized voice, packetized video, and any other appropriate packetized information streams. The switching system may provide POTS on multiple subscriber line ports, with built-in facilities to bidirectionally convert between the analog POTS and packetized digital service to and from the CO. It may also provide suitable xDSL service over the POTS that is provided on each subscriber line, with connectivity to an Internet service provider (ISP) for each of the subscriber lines. It may provide a built-in LAN port (based on Ethernet or otherwise) and an associated switching (or routing) bridge to support the creation of a LAN inclusive of the subscriber line data channels and the LAN port. It may provide LAN service even for subscriber data connections using the Point to Point (PPP) protocol. The ability to provide these and other service options to multiple users within a community is an important technical advantage over prior systems.

Moreover, the switching system of the present invention is "stackable" using interconnecting links that permit multiple smaller devices to operate as if they were a single larger device. The interconnecting "stack links" between devices can be modular and multiprotocol. These features contribute to the enhanced scalability of the system and may allow for economical incremental expansion beginning with a low cost of entry version with a low port count. The switching system is more manageable than prior systems, permitting both local and remote configuration and monitoring. It may support single or multiple physical links to one or more COs, providing data link fault tolerant operation, higher bandwidth, and other important technical advantages. It may also provide for distributed Inverse Multiplex ATM (IMA) operation using these CO links. The present invention allows various combinations of these and other services to be provided at lower total cost than with multiple overlapping systems to provide such services piecemeal.

Systems and methods incorporating one or more of these or other technical advantages are well suited for user communities desiring integrated voice, data, video, and other communications services. Other technical advantages are readily apparent to those skilled in the art from the following figures, descriptions, and claims.

BRIEF DESCRIPTION OF THE DRAWINGS

To provide a more complete understanding of the present invention and further features and advantages thereof, reference is now made to the following description taken in conjunction with the accompanying drawings, in which:

FIGS. 7A and 7B illustrate exemplary methods of communicating outgoing and incoming information, respectively, at a customer premises;

FIG. 8 illustrates an exemplary method of communicating voice and data information associated with one or more subscribers;

FIGS. 9A and 9B illustrate two exemplary methods of prioritizing between voice and data signals.

DETAILED DESCRIPTION OF THE INVENTION

Figure 1:
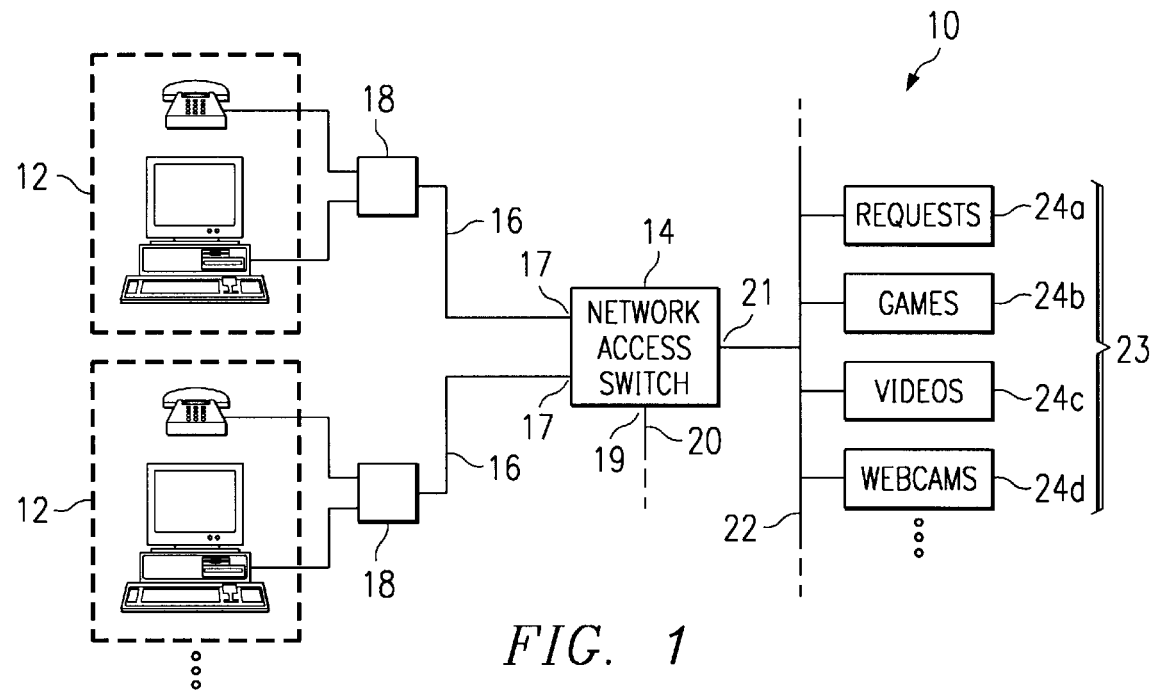
FIG. 1 illustrates an exemplary system for communicating information at a customer premises.

FIG. 1 illustrates an exemplary system 10 for communicating information in a subscriber community to provide integrated audio, video, data, and other appropriate services to subscribers. The subscriber community may include a business, apartment complex, retirement community, correctional facility, or any other customer premises in which subscribers share communications infrastructure and resources. Each subscriber in the served community has one or more associated telephones, personal computers, facsimile machines, or other devices to interface with the public switched telephone network (PSTN) or other telephone network, a local area network (LAN), metropolitan area network (MAN), wide area network (WAN), a global network such as the Internet, or any other suitable networks. Such devices may be referred to collectively, where appropriate, as subscriber devices 12. Network access switch 14 is coupled to subscriber devices 12 using subscriber lines 16 (and their subscriber line ports 17) and associated splitters 18, which separate (or combine) the voice or other "narrowband" signals from the video, data, or other "wideband" or "broadband" signals as they are communicated to (or from) subscribers in the community. One or more splitters 18 may be integral to or separate from network access switch 14. Reference to voice signals, voice calls, voice traffic, or the like is meant to encompass any suitable narrowband telephone signals, calls, or traffic. Analogously, reference to data signals, data calls, data traffic, or the like is meant to encompass any appropriate video, multimedia, data, or other wideband or broadband signals, calls, or traffic. In one embodiment, the subscriber lines 16 include asymmetric or other digital subscriber lines (xDSL) 16 and communicate xDSL signals that include, depending on traffic characteristics at the time, voice signals, data signals, or both voice signals and data signals.

Network access switch 14 communicates voice and data signals between the subscriber devices 12 and external networks using one or more links 20, which provide a single logical link between the network access switch 14 and such external networks. The connection between network access switch 14 and link 20 may be referred to as a logical port 19 of network access switch 14. In one embodiment, link 20 is a T1 or other WAN link that supports Asynchronous Transfer Mode (ATM), Internet Protocol (IP), Frame Relay (FR), or any other suitable packet-based WAN protocol. Although packets (as opposed to frames) are primarily discussed, reference to packets is meant to include packets, frames, cells, and other suitable units, as appropriate. Reference to frames or cells are to be similarly broadly construed, as appropriate. Link 20 may include any wireline or wireless communications link providing suitable broadband characteristics over a distance of interest, often the distance between network access switch 14 and a central office (CO) within the PSTN. Depending on the nature of link 20, voice signals received from subscribers may be packetized at network access switch 14 and then communicated over link 20 in association with data signals using voice over ATM (VOA), voice over IP (VoIP), voice over FR (VoFR), voice over DSL (VoD), or other appropriate protocol. Voice signals destined for subscribers may be depacketized at network access switch 14 and communicated over subscriber lines 16 to the subscribers in association with data signals using xDSL or another appropriate technique.

In addition to subscriber lines 16 and link 20 described above, network access switch 14 also supports a LAN port 21 providing an interface to an Ethernet or other suitable LAN 22. Using LAN 22, network access switch 14 provides subscribers with access to a number of shared resources, depending on the subscriber community and particular needs. In one embodiment, such resources may include a server complex 23 having a maintenance or other request server 24a, a game server 24b, a video on demand (VOD) or other video server 24c, a webcam server 24d, or any other suitable servers 24 for providing desired functionality to users in the community. Each server 24 may be coupled to one or more corresponding peripheral devices. For example, webcam server 24d may be coupled to one or more still or video cameras providing continuous or periodically updated images of selected areas of interest to the subscriber community. In an apartment complex, as merely an example, such areas might include one or more entrance areas, laundry areas, mailbox areas, swimming pool areas, parking areas, and any other suitable areas. The functionality provided using servers 24 generally depends on the needs of community subscribers and management, the types of services subscribers may be willing to pay for, and other appropriate factors. Although link 20 is primarily described as coupling network access switch 14 to a CO or other external network component, LAN port 21 may be used instead of in addition to link 20 to provide such connectivity.

Figure 2:
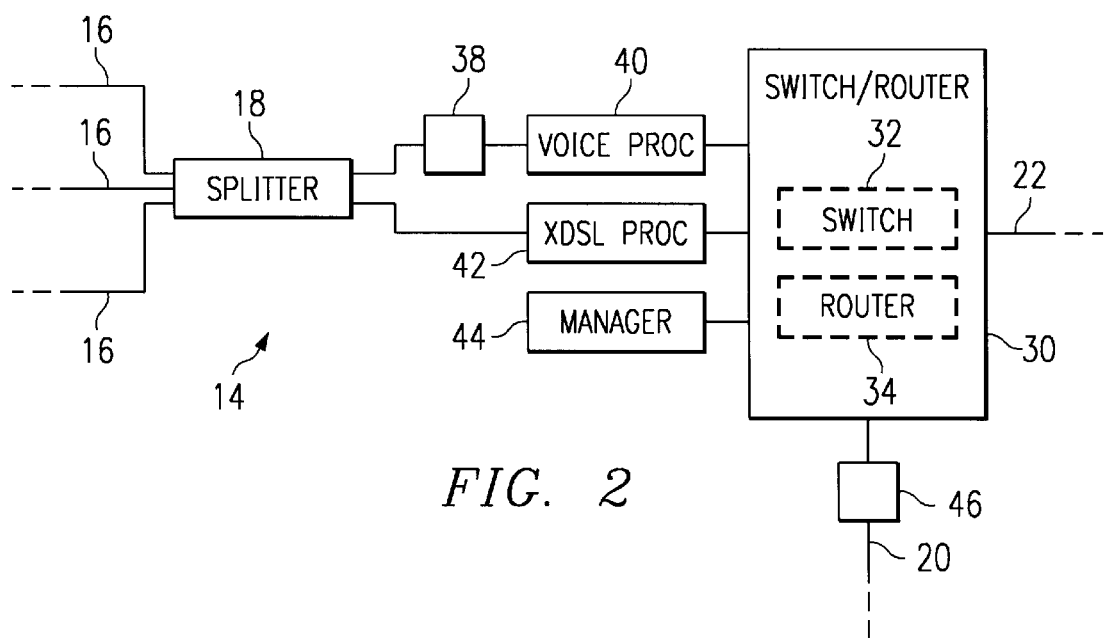
FIG. 2 illustrates an exemplary network access switch.

FIG. 2 illustrates an exemplary network access switch 14 that switches and routes voice, video, data, and other suitable subscriber signals using switch/router 30 incorporating switch 32 and router 34. Switch 32 and router 34 may be integral to or separate from one another and may be logically separate rather than physically separate entities. In general, switch 32 provide layer-2 switching functionality. Layer-2 switching functionality is appropriate for certain types of signals, such as voice signals, that are normally transported end-to-end by specific dedicated ATM switched virtual circuits (SVCs) or permanent virtual circuits (PVCs). Router 34 generally provides layer-3 routing functionality. Layer-3 functionality is appropriate for certain types of signals, such as IP signals or FR signals, where the desired routing of the data may vary from packet to packet and is determined by examining a portion of the content of each packet. In such cases, the function of the layer-3 router is to examine individual frames being transported over inbound ATM circuits, and to forward the frames via the appropriate outbound ATM circuits that will take them to their intended destination.

In one embodiment, switch 32 and router 34 collectively provide switching and routing functionality using a single switch matrix within the switch/router 30, although multiple switch matrices of switch/router 30 may be used if appropriate. Switch 32 is preferably implemented using one or more application specific integrated circuit (ASIC) devices, although switch 32 may be implemented in software running on a dedicated or shared processor or in any other appropriate manner according to particular needs. Similarly, router 34 may be implemented using one or more ASIC devices, software, or any other suitable technique. As described more fully below with reference to FIGS. 6A and 6B, where switch/router 30 processes ATM signals, the switch 32 may support Inverse Multiplex ATM (IMA) functionality according to the present invention. Voice processor 40 may be any commercial off-the-shelf or other voice processor that provides analog to digital (A/D) and digital to analog (D/A) conversion, monitors various channels and the types of signals communicated on the channels, optionally provides voice compression, packetizes voice streams into ATM or other frames, depacketizes ATM or other frames into voice streams, and provides any other suitable functionality, in any appropriate combination and without limitation. xDSL processor 42 provides functionality associated with a traditional DSL access multiplexer (DSLAM). In general, xDSL processor 42 provides modem functionality for encoding outgoing digital data signals into a broadband xDSL signal suitable for transmission over POTS, and for decoding incoming broadband xDSL signals into digital data signals. It provides the data interface between the external subscriber lines and the switch/router 30. It may also perform subscriber line management functions such as training, signal quality monitoring, and connection integrity monitoring.

In one embodiment, outgoing voice or other "narrowband" analog telephone signals received at network access switch 14 over subscriber line 16 are separated from any data signals using a splitter 18, processed as appropriate using subscriber line interface card (SLIC) 38 and voice processor 40, and received in packetized form at switch 32 for layer-2 switching. Each voice call may have a dedicated virtual circuit (VC), such that all voice signals for a particular call are switched to and communicated on the same VC. Although a dedicated VC for each call is primarily described, the present invention contemplates multiple calls on the same VC, each having a dedicated channel. In the particular embodiment in which network access switch 14 processes voice signals as ATM cells, switch 32 may use ATM adaptation layer type-2 (AAL-2) functionality, AAL type-1 (AAL-1) functionality, or both for switching packetized voice signals to ensure that ATM cells for a particular call are sent to the same VC. The packetized voice signals are communicated from switch/router 30 on the assigned VC to a CO or other network component associated with link 20 or to a subscriber device 12 associated with another subscriber line 16. Similarly, the incoming voice signals from the CO or subscribers 16 are switched at network access switch 14 using switch 32 and then communicated out to subscriber devices 12 through voice processor 40, SLIC 38, splitter 18, and subscriber lines 16.

In this embodiment, router 34 is not involved in routing or otherwise processing packetized voice signals within switch/router 30. As a result, there may be no need for private branch exchange (PBX) equipment within system 10 to handle voice calls, which may reduce costs associated with implementing and operating system 10. However, the present invention contemplates system 10 incorporating a suitable PBX for handling voice calls, whether alone or in cooperation with switch/router 30.

According to the present invention, data signals are treated somewhat differently than voice signals. In one embodiment, outgoing data signals are separated from the voice signals using splitter 18, processed as appropriate using xDSL processor 42, and received at the switch/router 30 in packetized form as ATM or other frames. Switch/router 30 uses switch 32 to switch the ATM cells in layer-2 fashion and communicate the cells on a first VC to router 34. Router 34 determines in layer-3 fashion a second VC for the cells and returns the cells to switch 32 on the second VC. Finally, switch 32 switches the cells out of switch/router 30 on the designated second VC to the appropriate destination. The destination may be a CO or other network component associated with link 20, a server 24 or other resource associated with LAN 22, or a subscriber device 12 associated with another subscriber line 16.

In one embodiment, layer-3 routing within switch/router 30 of packetized data signals may be managed and controlled using manager 44 in accordance with particular traffic, security, revenue, and other suitable considerations, providing an important technical advantage. In general, manager 44 measures utilization of data paths through network access switch 14 and, in response, provides one or more routing rules to router 34 for assignment of VCs and resulting routing of data signals through network access switch 14. Manager 44 may also control differential billing of a subscriber relative to other subscribers based on its measurement of the nature and quantity of data traffic associated with the subscriber at a particular time or during a particular interval. For example, when the bandwidth through network access switch 14 is scarce, manager 44 may bill a subscriber who is communicating or receiving a relatively large quantity of data traffic more per volume of data traffic than a subscriber who is communicating or receiving a smaller quantity of data traffic. Manager 44 may also monitor IP addresses associated with data signals subscribers communicate and receive, communicating this information to an appropriate server 24 using LAN 22. To improve security or for any other suitable reason, manager 44 may have a dedicated VC.

Analogously, incoming packetized data signals are received at switch/router 30 and switched, in layer-2 fashion at switch 32, to router 34 on a first VC. The router 34 determines in layer-3 fashion a second VC for the cells and returns these cells to switch 32 on the designated second VC. Finally, the switch 32 switches the cells out of the switch/router 30 on the second VC to a subscriber device 12 using xDSL processor 42, splitter 18, and a suitable subscriber line 16. In the particular embodiment in which network access switch 14 processes the data signals as ATM cells, appropriate ATM adaptation layer type-5 (AAL-5) functionality may be used within network access switch 14. For example, link 20 may be an IP link to the Internet, and protocol converter 46 may convert the IP packets received on link 20 to ATM frames, using AAL-5 techniques or otherwise, for communication to switch/router 30.

Thus, according to the present invention, network access switch 14 provides a forwarding mechanism for data signals (using switch 32 and router 34) that overlays a forwarding mechanism for voice signals (using switch 32 only) using a single switch matrix. As discussed above, among other benefits, the separate treatment of data signals using router 34 enables enhanced management and control with respect to these data signals according to the operation of manager 44.

In one embodiment, since subscriber devices 12 typically handle only a single VC, switch/router 30 preferably combines multiple incoming ATM streams on a single VC for communication to a subscriber device 12. Switch/router 30 collects the ATM cells corresponding to a particular ATM frame, which may arrive at switch/router 30 on a number of different VCs, interleaved with other frames arriving on the VCs, until all the cells for that frame have been received within switch/router 30. The cells for that frame are then assembled and the complete frame is forwarded for communication to subscriber device 12 on a single VC. For an outgoing ATM stream that switch/router 30 receives from subscriber device 12, switch/router 30 analogously communicates cells for a single frame to their destination on what may include multiple VCs.

Router 34 preferably multiplexes ATM cells from different VCs onto a single VC while preserving AAL-5 frame boundary integrity and ATM cell sequencing, possibly with assistance from switch 32. In a particular embodiment, router 34 maintains a cell queue for each inbound VC, preferably large enough to handle cells for several maximum size frames. Router 34 maintains a set of cell flags allowing it to keep track of cells constituting frame boundaries (indicating the first, last, or both first and last cells in each frame). Router 34 performs routing for an outbound VC in response to the last cell of a frame being forwarded from switch 32 to router 34, router 34 selecting from among the available inbound VCs for which the first cell of a frame destined for the outbound VC is available. This selection may occur according to such things as priority, relative link speeds of the inbound and outbound ports, "age" of the frames available to be forwarded, or any other suitable criteria. In one embodiment, to reduce interaction between multiple traffic types, the cell queues may be used only for the AAL-5 streams requiring this processing. For example and not by way of limitation, AAL type-0 (AAL-0) and AAL-2 cells might be forwarded immediately according to typical ATM mechanisms (being switched in layer-2 fashion by switch 32), since ATM cells can be switched in either layer-2 or layer-3 fashion. Although this processing is described primarily as being the task of router 34, switch 32 may cooperate with router 34 as appropriate to achieve the desired results. For example, router 34 may operate essentially independently of and parallel to switch 32 or may instead operate as a policy control mechanism that is more closely integrated with switch 32 and guides its operation.

In another embodiment more preferably suited to a software (as opposed to a hardware) implementation of this processing, the AAL-5 frames may be converted to memory-buffered frames using a segmentation and reassembly (SAR) mechanism. The frames may then be "switched" and passed back through the same or a different SAR mechanism to convert the frames back to AAL-5 format. Other appropriate techniques for ATM cell sequencing may be employed without departing from the intended scope of the present invention. Additionally, as described more fully below with reference to FIGS. 6A and 6B, suitable IMA functionality associated with switch/router 30 may participate in ATM cell sequencing.

In one embodiment, network access switch 14 may provide subscribers with simultaneous connectivity to an external Internet service provider (ISP) and one or more private local servers 24 (visible only to these subscribers, who are separated from the Internet by network access switch 14). In prior systems, if a computer communicates with an ISP or other external device using only the Point to Point (PPP) protocol, then either there is no connectivity to local devices or the local devices must be publicly visible on the Internet. Sometimes, neither of these conditions is desirable. According to the present invention, network access switch 14 provides subscribers visibility to private local devices (servers 24), providing associated LAN services using the PPP protocol, while simultaneously providing the subscribers with Internet access through connectivity to an external ISP. The PPP link may be a serial link (through a POTS or xDSL modem), PPP over ATM (e.g., over AAL-5), PPPoE (PPP over Ethernet), or any other suitable PPP connection methodology. The link may be configurable to operate in a conventional bridged mode, a conventional routed mode, or in PPP mode, with switch/router 30 automatically determining when PPP mode is being used.

In one embodiment, the switch/router 30 provides a switching bridge through which PPP streams may pass on their path from subscriber devices 12 (such as personal computers) to an external ISP. Switch/router 30 is also coupled to one or more servers 24. Switch/router 30 examines the contents of the PPP stream, selectively separates certain packets out of the PPP stream when it detects packets that are intended for a server 24, and forwards them only to the intended server 24. Similarly, packets arriving at switch/router 30 from a server 24 are formatted into the PPP format and gracefully inserted into the PPP stream sent back to the subscriber device 12. This is preferably done such that communications to and from the ISP are maintained for the packets exchanged between subscriber device 12 and Internet destinations reached through the ISP. In one embodiment, switch/router 30 makes these routing decisions using layer 3 addressing information (e.g., IP addresses) embedded in the packet headers, although any appropriate information in the packet may be used.

Switch/router 30 may monitor and intervene in the PPP negotiation process to influence the negotiation (by forcing specified choices, such as "no compression"), to know where in the PPP stream to look for the decision information, and to know the relevant identification information (e.g., the IP address) of the subscriber device 12. If the PPP stream is compressed, it may be necessary for switch/router 30 to decompress the PPP stream to make forwarding decisions. Alternatively, compressed PPP streams could simply be passed on without examination.

According to the present invention, network access switch 14 allows the local web servers 24 to be visible to subscriber devices 12, but not visible to external Internet users, even when subscriber devices 12 are network connected using a single network connection to an external ISP using the PPP protocol. For example only and without limitation, this feature may be particularly desirable for an apartment complex, where each resident may be provided a single (physical) network connection configured as a PPP link to an external ISP through network access switch 14 located on the premises, and where the apartment complex also provides, for example, web cameras at strategic sites associated with the complex (e.g., front gate, front door, playground, swimming pool, laundry room, or any other suitable location).

Figure 3:
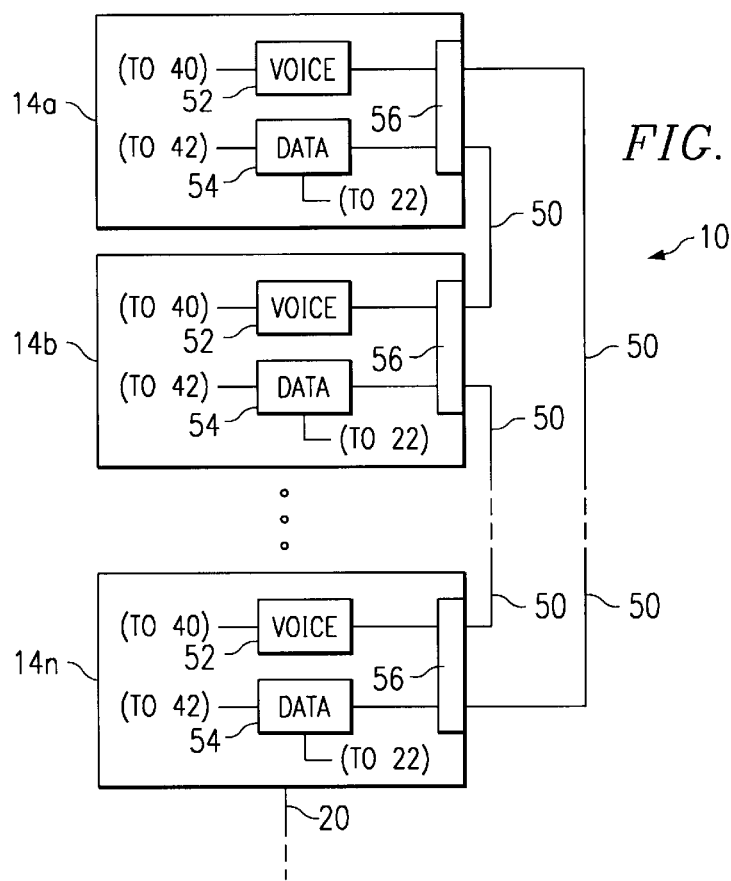
FIG. 3 illustrates an exemplary stacked configuration of multiple network access switches.

FIG. 3 illustrates an exemplary stacked configuration of multiple network access switches 14 coupled to one another using stack links 50. Although an exemplary "daisy chain" topology is shown, the present invention contemplates any number of network access switches 14 coupled to one another using a ring, mesh, or any other appropriate topology. Each network access switch 14 handles associated local voice signals 52 communicated with voice processor 40 and associated local data signals 54 communicated with xDSL processor 42 and LAN 22. Local voice signals 52 and local data signals 54 for a network access switch 14 may be communicated to other network access switches 14 using interface 56 and appropriate stack links 50. As an example, network access switch 14a may communicate its local voice signals 52 and local data signals 54 using its interface 56 to network access switch 14b, network access switch 14b may communicate its local voice signals 52 and local data signals 54 using its interface 56 to either or both network access switches 14a and 14c, and so on. Stack links 50 may each include one or more interconnect ports, such that any desired number of paths between devices may be supported with no shared points of failure other than the end devices themselves.

Since each network access switch 14 may not support its own link 20, local voice signals 52 and local data signals 54 destined for link 20 or subscriber lines 16 associated with another network access switch 14, or incoming voice and data signals received on link 20, may need to traverse multiple stack links 50 to reach its intended destination. The stacked configuration of multiple network access switches 14 coupled using stack links 50 may provide relatively inexpensive incremental growth, fewer single points of failure and thus increased fault tolerance, and other benefits. For example, for fault tolerance, network access switches 14 may be coupled in the daisy chain configuration shown, such that each network access switch 14 is coupled to two adjacent network access switches 14 and signals may be communicated between any of the non-failing network access switches 14 (assuming only one network access switch 14 in the chain has failed). Since each network access switch 14 supports a specified number of subscriber lines 16, incremental growth may be achieved by adding another network access switch 14 and associated stack links 50 to the configuration, rather than replacing a network access switch 14 with another network access switch 14 having a greater capacity.

In one embodiment, only one network access switch 14 among the collection of network access switches 14 supports a link 20, for cost savings, reduced complexity, or any other suitable reason. However, the present invention contemplates more than one link 20 for a collection of network access switches, for example, to provide redundancy and increased fault tolerance. In this case, if one of multiple links 20 fails, the capacity of system 10 may be decreased, yet communications to external networks on other links 20 will still be available. One or more links 20 may be associated with a collection of multiple network access switches 14 in any appropriate manner. Each stack link 50 preferably has at least the same bandwidth capacity as link 20, such that the signals received on link 20 are not undesirably slowed or otherwise impeded as they travel to their destinations, possibly through multiple stack links 50, even when traffic associated with one or more network access switches 14 is unusually heavy at that time. Similarly, switch/router 30 of each network access switch 14 is preferably able to process the maximum traffic associated with system 10, such that the overall traffic flow is not unduly slowed or otherwise impeded within a particular network access switch 14, even when the traffic associated with that network access switch 14 is unusually heavy at that time.

Figure 4:
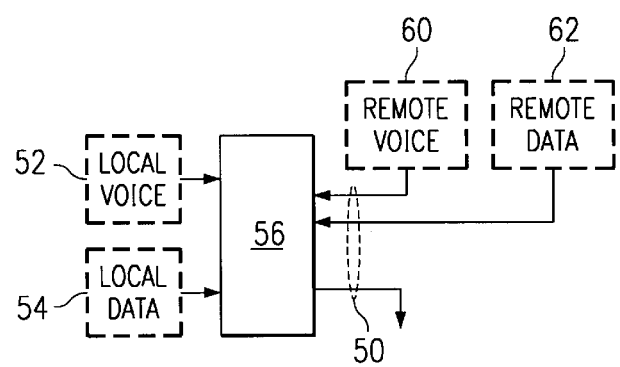
FIG. 4 illustrates an exemplary interface communicating local voice, local data, remote voice, and remote data signals.

According to the present invention, interface 56 within each network access switch 14 may implement an intelligent prioritization scheme to improve the efficient communication of voice and data signals through system 10. In this regard, at least two classes of information may be defined according to its time-sensitivity. Referring to FIG. 4, in one embodiment the first class of relatively time-sensitive information includes both remote voice signals 60 (originating across stack link 50) and local voice signals 52. Relatively time-insensitive information includes both remote data signals 62 (originating across stack link 50) and local data signals 54 (originating within network access switch 14 of interface 56). Interface 56 attempts to maintain absolute priority of voice signals over data signals. These classifications reflect the fact that voice traffic is generally subject to an end-to-end delay budget, making it preferable to add as little delay as possible in passing voice signals between network access switches 14 using one or more stack links 50. In contrast, data traffic is generally less delay sensitive and may therefore be placed behind voice traffic in terms of relative priority. Although remote signals are shown entering interface 56 in a particular direction from adjacent network access switch 14, and combined remote and local signals are shown leaving interface 56 in a particular direction to another adjacent network access switch 14, this description applies similarly to all signals entering or leaving interface 56, regardless of direction or the one or more other network access switches 14 involved.

Figure 5:
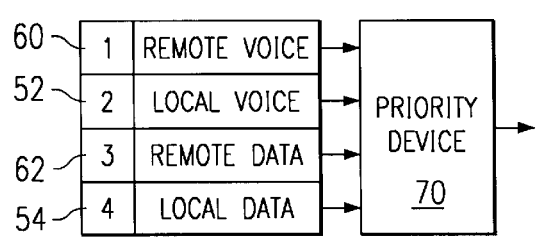
FIG. 5 illustrates an exemplary prioritization scheme.

Within each of these two classes, interface 56 attempts to preserve the priority based on origination across at least a portion, and preferably the entire, stack of network access switches 14. This preferably minimizes variations in delivery latency, particularly the latency associated with traversing one or more stack links 50. In addition, it is generally preferably for the system not to favor one network access switch 14 within the stack, the network access switch 14 closest to link 20 for example, relative to the other network access switches 14. FIG. 5 illustrates an exemplary prioritization scheme that is implemented within a signal scheduler or other priority device 70 within interface 56 or otherwise associated with network access switch 14. In one embodiment, remote voice signals 60 are given highest priority, local voice signals 52 are given second highest priority, remote data signals 62 are given third highest priority, and local data signals 54 are given fourth highest priority. Additional sub-classes and priority levels for voice signals, data signals, or both voice and data signals may be defined. It is assumed that link 20 has sufficient bandwidth to handle all voice signals 52 and 60 without undue queuing delay, although the bandwidth of link 20 may be insufficient to handle all data signals 54 and 62 without possibly significant such delay.

These relative priorities may be altered, if suitable, without departing from the intended scope of the present invention. In one embodiment, timestamps (which are synchronized across network access switches 14 in the stack) may be inserted into the traffic upon or in association with its receipt at network access switch 14, its processing within network access switch 14, or in any other suitable manner. If priority device 70 is prepared to communicate signals and voice signals 52, 60, or both 52 and 60 are present, priority device 70 may use the timestamps to select the "oldest" voice signals 52 or 60 for communication, neither the remote voice signals 60 nor the local voice signals 52 having priority over one another. Alternatively, such as where timestamps are impractical or otherwise undesirable, priority device 70 may apply the described four-level priority scheme to selectively communicate remote voice signals 60 before local voice signals 52. If no voice traffic is present, but data traffic is present, then priority device 70 may use the timestamps to select the oldest data signals 54 or 62 for communication, neither remote data signals 62 nor local data signals 54 having priority over one another. Alternatively, such as where timestamps are impractical or otherwise undesirable, priority device 70 may apply the described four-level priority scheme to selectively communicate remote data signals 62 before local data signals 54. If at any point only one type of signals are present, priority device 70 may simply select and communicate those signals (preferably oldest signals first), with or without regard to the priority scheme.

In addition, the prioritization scheme may use a sub-algorithm to shape data traffic according to factors such as which traffic generates the most revenue for the system operator, whether traffic is associated with a user who has paid a premium or more than other users, or any other suitable factors. For example, a non-premium user may have paid for use of 1 Mbps of pre-allocated bandwidth, while a premium user may have paid a greater amount for use of 2 Mbps. As a result, local data signals 54 associated with the premium user may be given a higher priority than remote data signals 62 associated with the non-premium user. Such a sub-algorithm may select among remote data signals 62 and local data signals 54 according to recent per-port traffic statistics relative to configured per-port bandwidth allowances. For example, interface 56 may examine recent traffic statistics, scale local data signals 54 according to what associated users have paid, and use an appropriate share of available bandwidth to communicate local data signals 54. Other network access switches 14 may similarly be trusted to appropriately scale their local data signals 54 in a similar manner.

In one embodiment, the described prioritization schemes allow preservation of quality of service (QoS) for various classes of data traffic in an environment, in this case a stacked configuration of multiple network access switches 14, that does not formally support QoS. These schemes also support concurrent voice and data traffic. Although specific schemes are described, the present invention contemplates prioritizing among remote voice signals 60, local voice signals 52, remote data signals 62, and local data signals 54 in any suitable manner to optimize the flow of traffic into, within, and out of one or more stacked network access switches 14. One or more prioritization schemes may be implemented at each interface 56 for each cell, frame, packet, or other suitable signal unit as it travels between the network access switches 14 using one or more stack links 50. Alternatively, one or more prioritization schemes may be wholly or partially distributed among multiple interfaces 56, as appropriate.

For an embodiment utilizing ATM as the transport mechanism, the prioritization schemes discussed may either supplement or replace, in whole or in part, the normal ATM QoS mechanisms. This is particularly significant when the stack links 50 are of relatively low bandwidth, as might be the case with copper connections, and the offered data traffic load greatly exceeds the stack link 50 bandwidth capability.

As described above, multiple links 20 may be coupled to an association of one or more network access switches 14 to increase fault tolerance or for any other suitable reason. When multiple physical communication links are coupled between a CO and a customer premises equipment (CPE) device, such as when multiple links 20 are used, it is generally desirable to use all of the "up" links from the CO to the CPE device to obtain maximum possible bandwidth. For ATM networks, the standard IMA protocol may be sufficient to provide this result. However, IMA assumes that all such links terminate on a single device that performs any ATM cell sequencing necessary to restore proper cell sequence, which may have been disturbed as a result of differential latency between the multiple links. If the CPE device is instead distributed, as is the case when multiple network access switches 14 are stacked and are coupled using stack links 50, then this is plainly not the case.

Figure 6B:
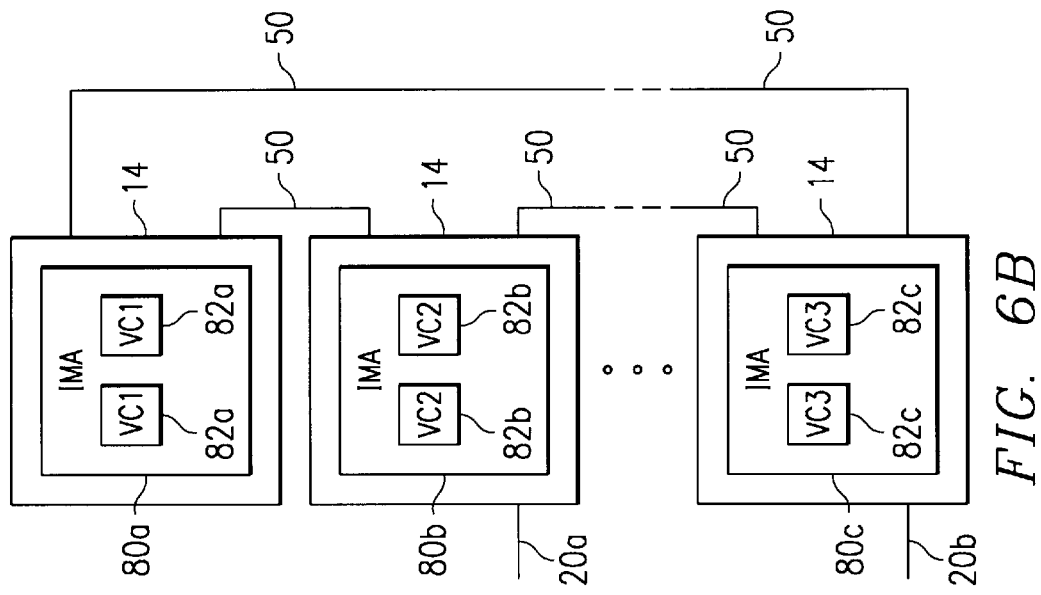
FIG. 6 illustrates exemplary network access switches supporting distributed IMA functionality.
Figure 6A:
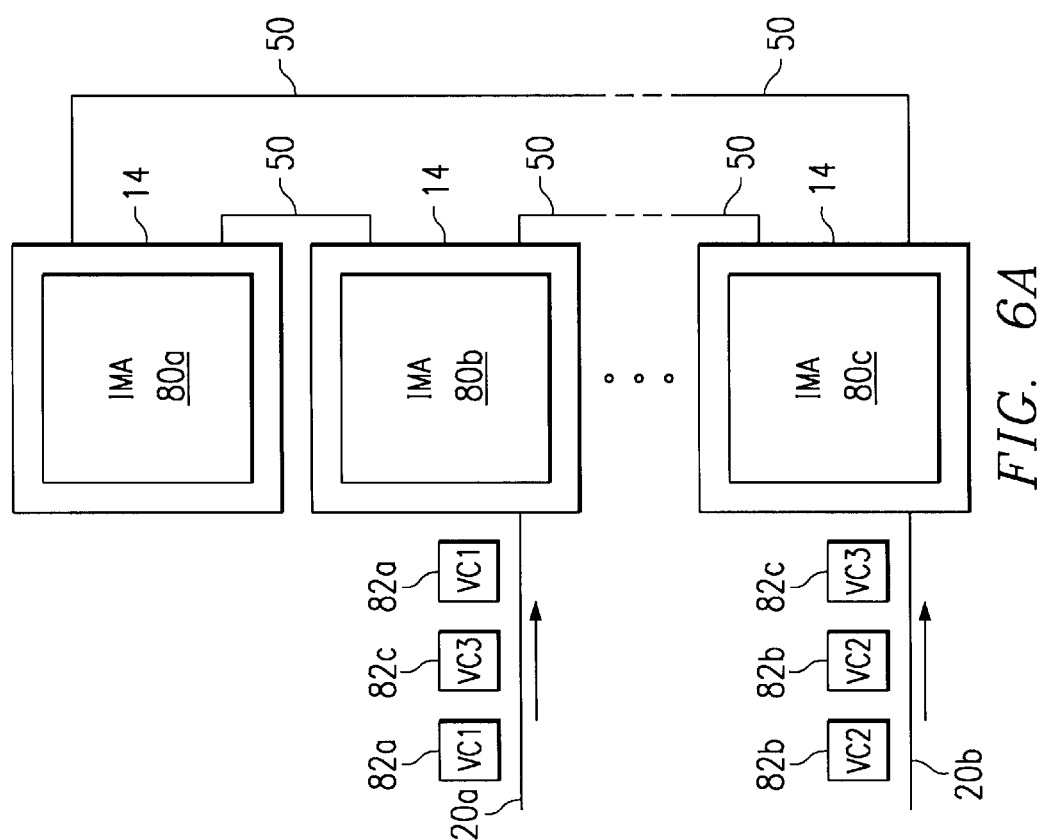

FIGS. 6A and 6B illustrate an exemplary configuration of multiple stacked network access switches 14 collectively associated with at least two links 20a and 20b. Links 20a and 20b may be referred to in the singular as link 20 and in the plural as links 20. Those skilled in the art appreciate that any number of links 20 may be associated with network access switches 14 without departing from the intended scope of the present invention. In general, each VC must be statically allocated among links 20a and 20b. For example, a particular VC may be entirely on link 20a, switching to link 20b only in response to failure of link 20a. Similarly, the VC may be entirely on link 20b, switching to link 20a only in response to failure of link 20b. Alternatively, the VC may instead be partitioned in some suitable manner between links 20a and 20b. However, regardless of the exact manner in which the VC is allocated, that allocation is generally static for the duration of the VC and cannot be dynamically modified According to the present invention, rather than provide full IMA functionality in a single network access switch 14 as the IMA standard contemplates, IMA functionality may be distributed among multiple network access switches 14 as a component of switch/routers 30 within the network access switches 14. In one embodiment, for a particular VC, all network access switches 14 direct incoming ATM signals for that VC to an appropriate destination network access switch 14 for IMA processing. For example, as shown in FIG. 6A, VCs 82a and 82b may each be completely allocated to links 20a and 20b, respectively, while VC 82c may be partitioned among links 20a and 20b in a suitable manner. VCs 82a, 82b, and 82c may be referred to in the singular as VC 82 and in the plural as VCs 82. IMA functionality 80a, 80b, and 80c may be referred to either in the singular or in the plural as IMA functionality 80.

As shown in FIG. 6B, regardless of associations between VCs 82 and links 20, VCs 82 are each directed to the appropriate destination network access switch 14 for IMA processing using IMA functionality 80 of the associated switch/router 30. For example, in the illustrated embodiment, all ATM signals on VC 82a are directed for processing by IMA functionality 80a, all signals on VC 82b are directed for processing by IMA functionality 80b, and all the signals on VC 82c are directed for processing by IMA functionality 80c. ATM cell sequencing, according to the IMA protocol, is performed at each network access switch 14 for corresponding VCs 82, independent of the ATM cells directed to the other network access switches 14. The outgoing ATM cells from each network access switch 14 are similarly directed to the appropriate links 20 for communication to the CO, which is assumed to support IMA processing of ATM cells receiving from the stack of network access switches 14.

Providing distributed IMA functionality 80 according to the present invention provides a number of important technical advantages. An alternative solution might be to provide IMA functionality at only a single network access switch 14 within a stack. Although this may provide cost benefits relative to providing complete or partial IMA functionality in multiple network access switches 14, doing so would require use of valuable bandwidth on stack links 50 to communicate the incoming ATM signals from the network access switch 14 on which they were received to the network access switch 14 supporting the IMA functionality. Doing so would also result in increased delay, since the ATM signals might in general need to traverse the same one or more stack links 50 multiple times, depending on the relationship between the network access switch 14 on which incoming ATM signals were received, the network access switch 14 supporting the IMA functionality, and the destination network access switch 14. The distribution of IMA functionality 80 according to the present invention reduces or eliminates these problems.

Because the IMA protocol is used, if one of N links 20 fails, all the incoming ATM traffic becomes present on the remaining N-1 links 20. However, the present invention additionally ensures that if one network access switch 14 fails, only IMA functionality 80 associated with the failed network access switch 14 may be lost, since IMA functionality 80 is distributed among at least some and preferably all of the other network access switches 14. In one embodiment, failure of a network access switch 14 may result in loss of associated link 20, subscriber lines 16, switch/router 30 including IMA functionality 80, and one or more stack links 50. Therefore, in one embodiment, network access switches 14 are preferably coupled in a daisy chain, ring, mesh, or other suitable topology in which each network access switch 14 is coupled to at least two adjacent network access switches 14 and traffic may be communicated between any two non-failing network access switches 14 (assuming only one network access switch 14 in the configuration has failed). Although a distributed CPE end is described, the present invention contemplates distributing IMA functionality 80 to support terminating links 20 on multiple devices within a distributed CO end instead of or in addition to a distributed CPE end.

Figure 7B:
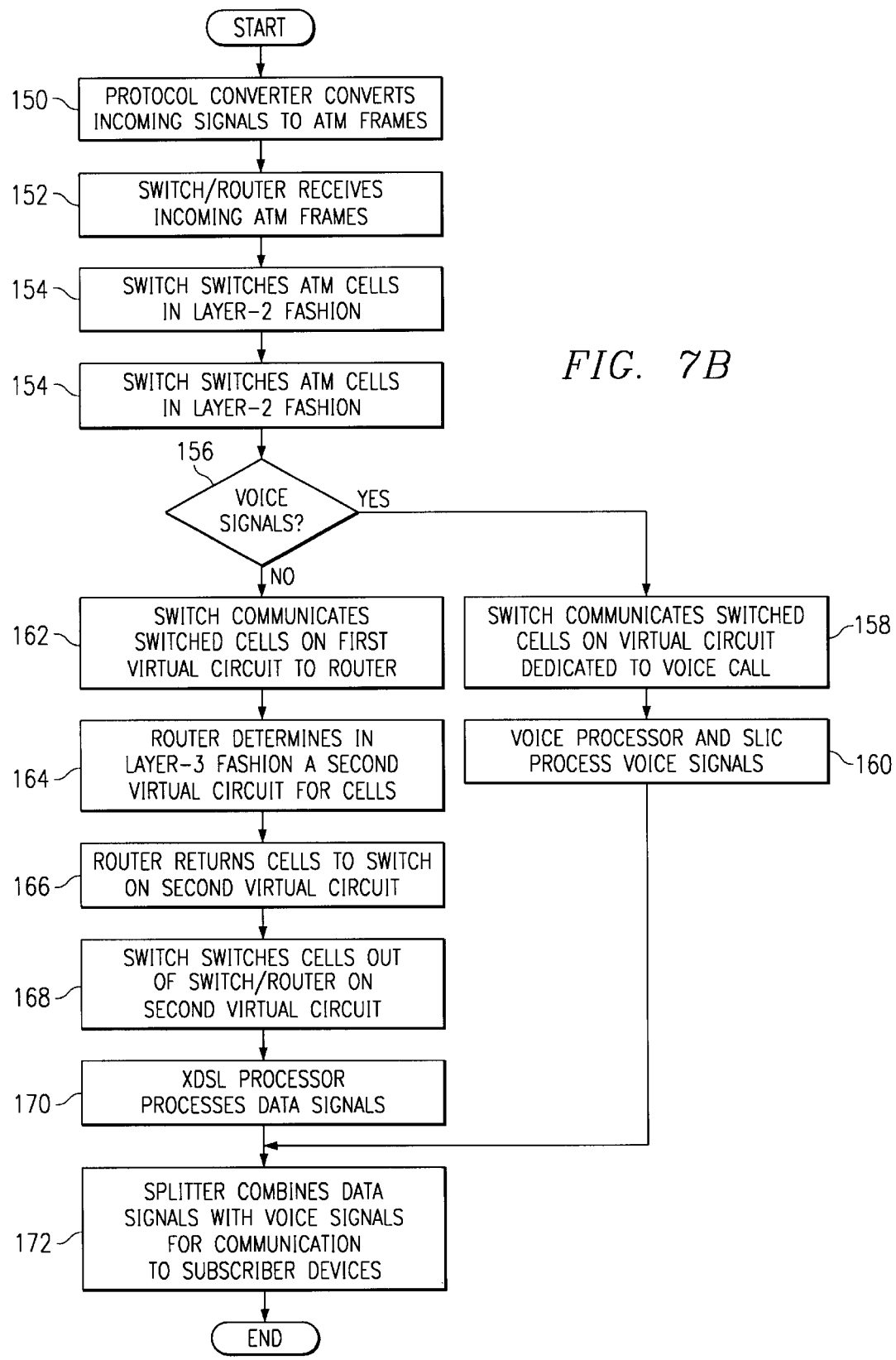

FIGS. 7A and 7B illustrate exemplary methods of communicating outgoing and incoming information, respectively, at a customer premises. Although the methods of FIGS. 7A and 7B are described primarily with respect to ATM frames and cells, the present invention contemplates the voice and data signals being formatted in any appropriate manner. Referring to FIG. 7A for outgoing traffic, the method begins at step 100, where splitter 18 separates outgoing data signals from outgoing voice signals. The separated voice signals are processed as appropriate using SLIC 38 and voice processor 40 at step 102 and received in packetized form at switch/router 30 at step 104. Switch 32 switches the associated cells in layer-2 fashion at step 106, communicates the switched cells out of switch/router 30 on the VC dedicated to the particular call at step 108, and the method ends. In the particular embodiment in which network access switch 14 processes voice signals as ATM cells, switch 32 may use AAL-2 functionality, AAL-1 functionality or both for switching packetized voice signals to ensure that ATM cells for a particular call are sent to the same dedicated VC.

As discussed above, the separated outgoing data signals are treated somewhat differently than the outgoing voice signals. After the data signals are separated from the voice signals at step 100, xDSL processor 40 processes the data signals as appropriate at step 110 and switch/router 30 receives the data signals in packetized form at step 112. Switch 32 switches the associated cells containing the data signals in layer-2 fashion at step 114 and, at step 116, communicates the switched cells on a first VC to router 34. Router 34 determines in layer-3 fashion a second VC for the cells at step 118 and returns the cells to switch 32 on the second VC at step 120. In one embodiment, as described above, layer-3 routing of data signals may be managed and controlled using manager 44 according to particular traffic, security, revenue, or any other suitable considerations. Finally, at step 122, switch 32 switches the cells out of switch/router 30 on the second VC to the appropriate destination, and the method ends. The destination may be a CO or other network component associated with link 20, a server 24 or other resource associated with LAN 22, or a subscriber device 12 associated with another subscriber line 16.

Referring to FIG. 7B for incoming traffic, the method begins at step 150, where protocol converter 46 may convert incoming packetized signals, such as IP packets received on link 20, to ATM frames. Switch/router 30 receives the incoming ATM frames at step 152 and switch 32 switches the corresponding ATM cells in layer-2 fashion at step 154. If the cells represent voice signals at step 156, switch 32 communicates the switched cells on the assigned VC dedicated to the particular call at step 158, voice processor 40 and SLIC 38 process the voice signals as appropriate at step 160, and the method proceeds to step 172. Alternatively, if the cells represent data signals at step 156, switch 32 communicates the switched cells on a first VC to router 34 at step 162. At step 164, router 34 determines in layer-3 fashion a second VC for the cells and, at step 166, returns the cells to switch 32 on the second VC. Switch 32 then switches the cells out of switch/router 30 on the second VC at step 168 and xDSL processor 42 processes the data signals as appropriate at step 170. At step 172, splitter 18 combines the data signals (received from xDSL processor 42) with the voice signals (received from SLIC 38) for communication to subscriber devices 12, and the method ends.

FIG. 8 illustrates an exemplary method of communicating voice and data information associated with one or more subscribers. The method begins at step 200, where a first network access switch 14 may associate timestamps (which are preferably synchronized across network access switches 14 in the stack) with remote voice signals 60 and remote data signals 62 upon or in association with their receipt at first network access switch 14, during their processing within first network access switch 14, or in any other suitable manner. The present invention contemplates timestamps being associated with the traffic before its receipt at first network access switch 14. At step 202, first network access switch 14 communicates remote voice signals 60 and remote data signals 62 to a second network access switch 14 using an appropriate stack link 50. Second network access switch 14 receives the remote voice signals 60 and remote data signals 62 at step 204 using interface 56. At step 206, second network access switch 14 receives local voice signals 52 and local data signals 54 from subscribers associated with second network access switch 14 using corresponding subscriber line ports 17. At step 208, second network access switch 14 may associate timestamps with local voice signals 52 and local data signals 54 upon or in association with their receipt at second network access switch 14, during their processing within second network access switch 14, or in any other suitable manner. The present invention contemplates timestamps being associated with the traffic before its receipt at first network access switch 14. As described above, timestamps associated with the various voice and data traffic processed at second network access switch 14 may be used in determining the relative priority of such traffic for subsequent communication from the second network access switch 14.

At step 210, second network access switch 14 communicates the local voice signals 52 and local data signals 54 from the subscriber line ports 17 on which they were received to interface 56. Second network access switch 14 applies one or more priority schemes at step 212 using priority device 70 within interface 56. For example, as described more fully above with reference to FIG. 3 and below with reference to FIGS. 9A and 9B, the relative priorities among local voice signals 52, local data signals 54, remote voice signals 60, and remote data signals 62 may be determined according to the described four-level priority scheme, timestamps associated with the signals (thereby indicating the "oldest" signals of each type), a sub-algorithm for shaping data traffic according to revenue, bandwidth, or any other suitable considerations, or any other appropriate technique, singly or in any combination. At step 214, second network access switch 14 communicates the signals in accordance with the selected priority scheme, and the method ends.

Figure 9B:
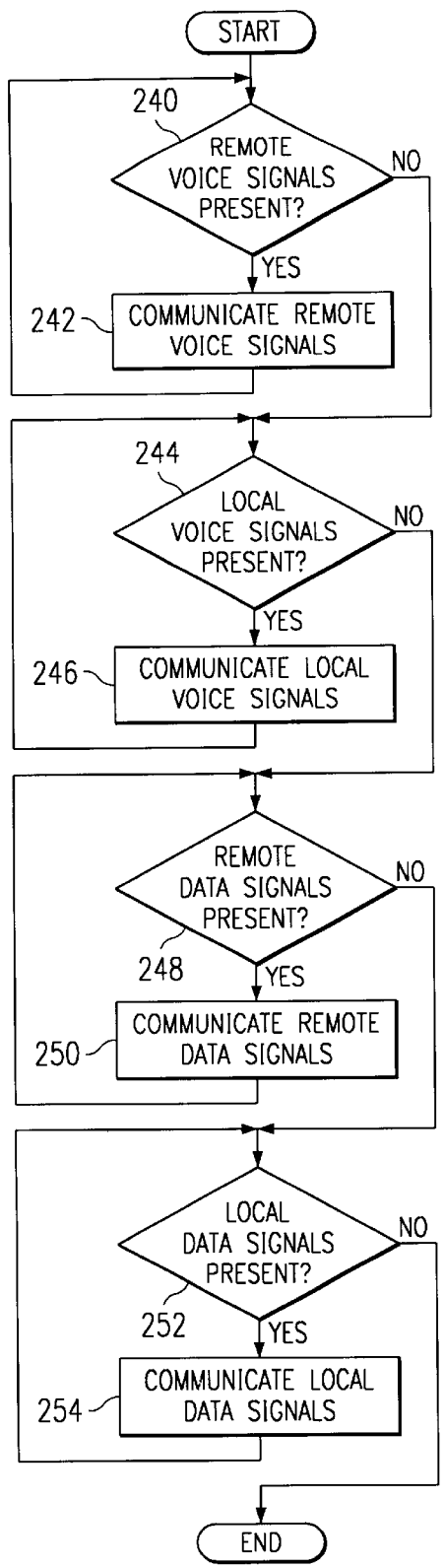

FIGS. 9A and 9B illustrate two exemplary methods of prioritizing between types of voice and data traffic for communication from network access switch 14. The method illustrated in FIG. 9A relies in part upon timestamps associated with the traffic to be prioritized. The method begins at step 220, where if local voice signals 52, remote voice signals 60, or both local signals 52 and 60 are present, network access switch 14 communicates the oldest available voice signals 52 or 60 at step 222 based on timestamps associated with the voice signals 52 and 60. In this embodiment, neither remote voice signals 60 nor local voice signals 52 have priority over one another. After communicating the oldest available voice signals 52 or 60 at step 222, the method returns to step 220 and repeats until no voice signals 52 or 60 are present, in which case the method proceeds to step 224. If local data signals 54, remote data signals 62, or both data signals 54 and 62 are present at step 224, network access switch 14 communicates the oldest available data signals 54 or 62 at step 226 based on timestamps associated with the data signals 54 and 62. In this embodiment, neither remote data signals 62 nor local data signals 54 have priority over one another. After communicating the oldest available data signals 54 or 62, the method returns to step 224 and repeats until no data signals 54 or 62 are present, in which case the method ends.

FIG. 9B illustrates prioritization according to the four-level priority scheme described above, although any suitable priority scheme may be used without departing from the intended scope of the present invention. In addition, although the method is described irrespective of timestamps or any determination of the relative "age" of the traffic to be communicated, the present invention contemplates suitably combining the methods of FIGS. 9A and 9B in whole or in part, if appropriate, according to particular needs. For example, as described above, remote voice signals 60 may have higher priority than local voice signals 52, while remote data signals 62 and local data signals 54 may have the same priority and be communicated oldest signals first.

The method begins at step 240, where if remote voice signals 60 are present, network access switch 14 selectively communicates the available remote voice signals 60 at step 242. The method returns to step 240 and repeats until no more remote voice signals 60 are present, in which case the method proceeds to step 244. If local voice signals 52 are present at step 244, network access switch 14 selectively communicates the local voice signals 52 at step 246. The method then returns to step 244 and repeats until no local voice signals 52 are present, in which case the method proceeds to step 248.

If remote data signals 62 are present at step 248, network access switch 14 selectively communicates the remote data signals 62 at step 250. The method then returns to step 248 and repeats until no remote data signals 62 are present, in which case the method proceeds to step 252. If local data signals 54 are present at step 252, network access switch 14 selectively communicates the local data signals 54 at step 254. The method then returns to step 252 and repeats until no local data signals 54 are present, in which case the method ends. Although the method is described as proceeding forward in time between its steps, the decision flow represented in FIG. 9B may occur at substantially one time or the method may at any time return to a previous step such that the highest priority traffic available is always communicated first.

Figure 10:
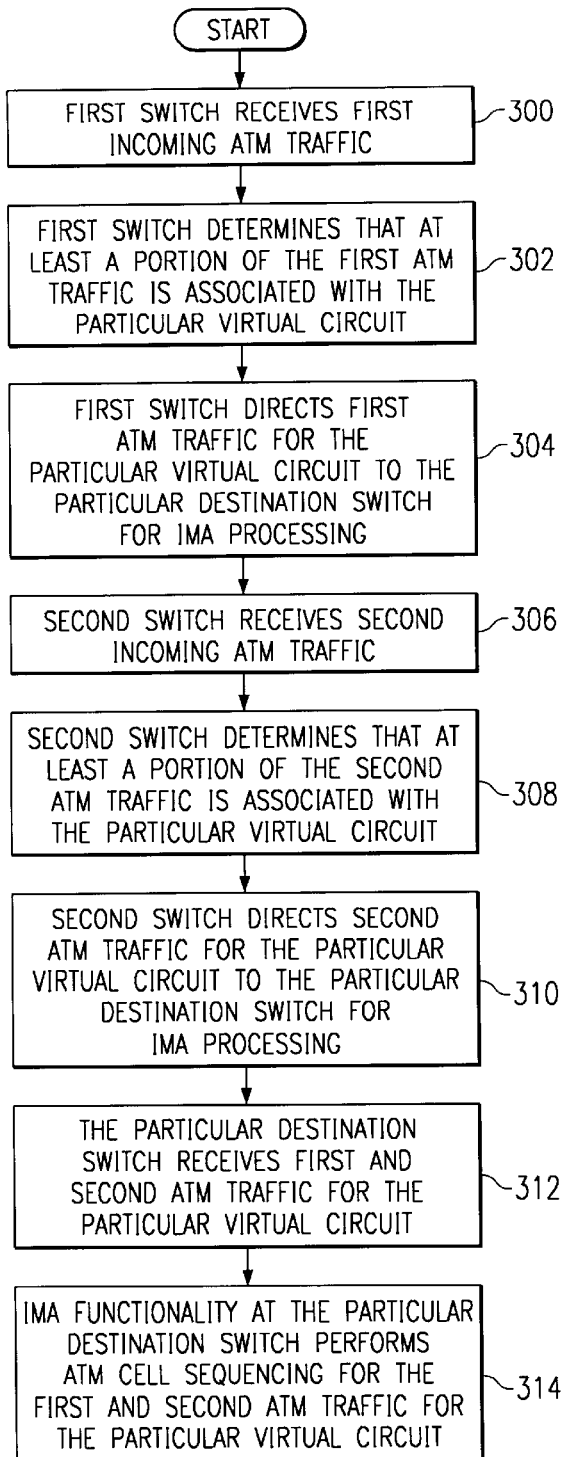
FIG. 10 illustrates an exemplary method of communicating information at a customer premises or distributed central office using Inverse Multiplex ATM (IMA) functionality.

FIG. 10 illustrates an exemplary method of communicating information at a customer premises or distributed CO using Inverse Multiplex ATM (IMA) functionality. The method begins at step 300, where a first network access switch 14 receives first incoming ATM traffic. At step 302, first network access switch 14 determines that at least a portion of the first ATM traffic is associated with a particular VC. At step 304, first network access switch 14 directs that portion of the first ATM traffic for the particular VC to a particular destination network access switch 14 for IMA processing. A second network access switch 14 receives second incoming ATM traffic at step 306 and, at step 308, determines that at least a portion of the second ATM traffic is associated with the particular VC. At step 310, the second network access switch 14 directs that portion of the second ATM traffic for the particular VC to the particular destination network access switch 14 for IMA processing. At step 312, the particular destination network access switch 14 receives the portions of the first and second ATM traffic for the particular VC. At step 314, IMA functionality at the particular destination network access switch 14 performs cell sequencing for the received portions of the first and second ATM traffic for the particular VC, and the method ends. Although the method is described for purposes of explanation as involving an exemplary configuration of at least three network access switches 14, the present invention contemplates the method being performed with respect to any appropriate configuration of two or more network access switches 14, at least one of which first determines that certain ATM traffic is associated with a VC having another network access switch 14 as its destination, and then directs that ATM traffic to the destination network access switch 14 for cell sequencing with other ATM traffic for that VC.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A switching system at a customer premises to communicate voice and data information associated with one or more subscribers, comprising:

a local area network (LAN) port to communicate data signals with a server complex using a LAN to provide one or more data services accessible to some or all subscribers;

a logical port to communicate data signals and packetized voice signals with a central office (CO);

a plurality of subscriber line ports to communicate digital subscriber line (xDSL) signals with the subscribers; and a switch/router operable to process voice signals differently from the data signals, the voice signals being directed out of the switch/router on the same virtual circuit (VC) on which they are received at the switch/router, the data signals being directed out of the switch/router on a different VC than the VC on which they are received at the switch/router;

the switching system operable to:

communicate data signals and plain old telephone service (POTS) voice signals between subscribers using the subscriber line ports;

communicate data signals and POTS voice signals between subscribers and the CO using the subscriber line ports and the logical port, the switching system operable to convert between the POTS voice signals of the subscriber lines and the packetized voice signals of the logical port; and communicate data signals between subscribers and the server complex using the LAN port.

2. The switching system of claim 1, wherein the server complex comprises one or more servers selected from the group consisting of:

a subscriber request server;

a game server;

a video on demand (VOD) server; and a webcam server.

3. The switching system of claim 1, wherein the logical port comprises one or more physical ports each coupled to a corresponding physical communications link between the switching system and the CO.

4. The switching system of claim 3, wherein each link comprises a wide area network (WAN) link supporting a protocol selected from the group consisting of:

Asynchronous Transfer Mode (ATM);

Internet Protocol (IP); and

Frame Relay (FR).

5. The switching system of claim 1, wherein the xDSL signals comprise at least asymmetrical DSL (ADSL) signals.

6. The switching system of claim 1, further comprising:

a splitter operable to separate voice signals received at the subscriber line ports from data signals received at the subscriber line ports, the splitter being further operable to communicate the separated voice and data signals;

a voice processor operable to receive the separated voice signals from the splitter, process the voice signals, and communicate the processed voice signals for routing within the switching system; and an xDSL processor operable to receive the separated data signals from the splitter process the data signals, and communicate the processed data for routing within the switching system.

7. The switching system of claim 1, wherein the switching system is further operable to provide connectivity to an Internet service provider (ISP) for each subscriber line port.

8. The switching system of claim 1, further comprising a manager operable to communicate one or more routing rules to the router for routing the data signals.

9. The switching system of claim 8, wherein the routing rules reflect one or more considerations selected from the group consisting of:

traffic considerations;

security considerations; and revenue considerations.

10. A switching system at a customer premises to communicate voice and data information associated with one or more subscribers, comprising:

a local area network (LAN) port to communicate data signals with a server complex using a LAN to provide one or more data services accessible to some or all subscribers;

a logical port to communicate data signals and packetized voice signals with a central office (CO);

a plurality of subscriber line ports to communicate digital subscriber line (xDSL) signals with the subscribers; and a switch/router operable to provide:

a switch operable to receive voice signals on a first virtual circuit (VC) and to switch the voice signals out of the switching system on the first VC, the switch further operable to communicate received data signals for routing; and a router operable to receive the data signals from the switch on a second VC, to determine a third VC for the data signals, and to route the data signals to the switch on the third VC for the data signals, and to route the data signals to the switch on the third VC for communication out of the switching system on the third VC;

the switching system operable to:

communicate data signals and plain old telephone service (POTS) voice signals between subscribers using the subscriber line ports;

communicate data signals and POTS voice signals between subscribers and the CO using the subscriber line ports and the logical port, the switching system operable to convert between the POTS voice signals of the subscriber lines and the packetized voice signals of the logical port; and communicate data signals between subscribers and the server complex using the LAN port.

11. The switching system of claim 10, further comprising a manager operable to communicate one or more routing rules to the router for determination of the third VC, wherein the routing rules reflect one or more consideration selected from the group consisting of:

traffic considerations;

security considerations; and revenue considerations.

12. The switching system of claim 10, wherein:

the voice signals and the data signals are handed within the switch/router as asynchronous transfer mode (ATM) frames;

the switch is operable to use either ATM adaptation layer type-2 (AAL-2) or ATM adaptation layer type-1 (AAL-1) functionality to ensure that the voice signals are switched to the first VC on which they are received; and the router is operable to use ATM adaptation layer type-5 (AAL-5) functionality to route the data signals from the second VC to the third VC.

13. The switching system of claim 10, wherein the switch/router comprises a single switch matrix operable to implement the switching and routing.

14. The switching system of claim 10, further comprising an interface for coupling to one or more other switching systems at the customer premises using one or more stack links, such that the switching systems are operable to function as a single logical unit communicate information between the subscribers, the CO, and the server complex.

15. A switching system at a customer premises for communicating voice and data information associated with one or more subscribers, comprising:

a switch operable to receive voice signals on a first virtual circuit (VC) and to switch the voice signals out of the switching system on the first VC, the switch further operable to communicate received data signals for routing, wherein the voice signals and the data signals are routed as asynchronous transfer mode (ATM) frames and the switch is operable to use either ATM adaptation layer type-2 (AAL-2) or ATM adaptation layer type-1 (AAL-1) functionality to ensure that the voice signals are switched to the first VC on which they were received; and a router operable to receive the data signals from the switch on a second VC, to determine a third VC for the data signals, and to route the data signals to the switch on the third VC for communication out of the switching system on the third VC, wherein the router is operable to use ATM adaptation layer type-5 (AAL-5) functionality to route the data signals from the second VC to third VC.

16. The switching system of claim 15, wherein a single switch matrix of the switching system is operable to implement the switching and routing.

17. A switching system of claim 15, further comprising a manager operable to communicate one or more routing rules to the router for routing of the data signals.

18. The switching system of claim 17, wherein the routing rules reflect one or more consideration selected from the group consisting of:

traffic considerations;

security considerations; and revenue considerations.

19. The switching system of claim 15, further comprising:

a splitter operable to separate voice signals received from subscribers from data signals received from subscribers, the splitter being further operable to communicate the separated voice and data signals;

a voice processor operable to receive the separated voice signals from the splitter, process the voice signals, and communicate the processed voice signals for routing within the switching system; and a digital subscriber line (xDSL) processor operable to receive the separated data signals from the splitter, process the data signals, and communicate the processed data signals for routing within the switching system.

20. The switching system of claim 15, wherein the switching system is further operable to selectively communicate available voice signals before available data signals, according to their relative priorities.

21. The switching system of claim 15, wherein:

the switching system further comprises an interface;

the interface is operable to receive remote voice signals and remote data signals from second switching system at the customer premises;

the interface is operable to receive local voice signals and local data signals from the switch;

the interface is further operable to selectively communicate the available signal having the highest priority;

remote voice signals have the highest priority;

local voice signals have the second highest priority; and data signals have the third highest priority.

22. The switching system of claim 21, wherein remote data signals have the third highest priority and local data signals have the fourth highest priority.

23. The switching system of claim 15, further comprising an interface for coupling to one or more other switching systems at the customer premises in a stackable configuration using one or more stack links, such that the switching systems are operable to function as a single logical unit in communicating information associated with the subscribers.

24. A method of communicating voice and data information at a customer premises associated with one or more subscribers, comprising:

communicating digital subscriber line (xDSL) signals between a switching system and subscribers using a plurality of subscriber line ports of the switching system, the xDSL signals comprising data signals and plain old telephone service (POTS) voice signals;

communicating data signals and packetized voice signals between the switching system and a central office (CO) using a logical port of the switching system;

converting between the POTS voice signals of the subscriber line ports and the packetized voice signals of the logical port for communication of voice signals between subscribers and the CO;

communicating data signals between the switching system and a server complex using a local area network (LAN) port of the switching system to provide one or more data service accessible to some or all subscribers;

processing voice signals at a switch/router of the switching system such that the voice signals are communicated out of the switch/router on the same virtual circuit (VC) on which they are received at the switch/router; and processing data signals at the switch/router differently from the voice signals such that the data signals are communicated out of the switch/router on a different VC than the VC on which they are received at the switch/router.

25. The method of claim 24, wherein the server complex comprises one or more servers selected from the group consisting of:

a subscriber request server;

a game server;

a video on demand (VOD) server; and a webcam server.

26. The method of claim 24, wherein the logical port comprises one or more physical ports each coupled to a corresponding physical communications link between the switching system and the CO.

27. The method of claim 26, wherein each link comprises a wide area network (WAN) link supporting a protocol selected from the group consisting of:
   Asynchronous Transfer Mode (ATM);
   Internet Protocol (IP); and
   Frame Relay (FR).

28. The method of claim 24, wherein the xDSL signals comprise at least asymmetrical DSL (ADSL) signals.

29. The method of claim 24, further comprising:
   separating voice signals received at the subscriber line ports from data signals received at the subscriber line ports using a splitter of the switching system;
   communicating the separated voice and data signals from the splitter;
   receiving the separated voice signals from the splitter at a voice processor;
   using the voice processor to process the voice signals;
   communicating the processed voice signals for routing within the switching system;
   receiving the separated data signals from the splitter at an xDSL processor;
   using the xDSL processor to process the data signals; and
   communicating the processed data signals for routing within the switching system.

30. The method of claim 24, further comprising using the switching system to provide connectivity to an Internet service provider (ISP) for each subscriber line port.

31. The method of claim 24, further comprising communicating one or more routing rules from a manager to the router for routing the data signals.

32. The method of claim 31, wherein the routing rules reflect one or more consideration selected from the group consisting of:
   traffic considerations;
   security considerations; and
   revenue considerations.

33. The method of claim 24, further comprising using an interface of the switching system and one or more stack links to couple the switching system to one or more other switching systems at the customer premises, such that the switching systems function as a single logical unit to communicate information between the subscribers, the CO, and the server complex.

34. A method of communicating voice and data information at a customer premises associated with one or more subscribers, comprising:
   communicating digital subscriber line (xDSL) signals between a switching system and subscribers using a plurality of subscriber line ports of the switching system, the xDSL signals comprising data signals and plain old telephone service (POTS) voice signals;
   communicating data signals and packetized voice signals between the switching system and a central office (CO) using a logical port of the switching system;
   converting between the POTS voice signals of the subscriber line ports and the packetized voice signals of the logical port for communication of voice signals between subscribers and the CO;
   communicating data signals between the switching system and a server complex using a local area network (LAN) port of the switching system to provide one or more data service accessible to some or all subscribers;
   receiving voice signals at a switch/router of the switching system on a first virtual circuit (VC);
   using a switch of the switch/router to communicate the voice signals out of the switching system on the first VC;
   receiving data signals at the switch/router;
   communicating the data signals from the switch on a second VC for routing;
   receiving the data signals from the switch at a router of the switch/router;
   determining a third VC for the data signals; and
   communicating the data signals from the router to the switch on the third VC for communication out of the switching system on the third VC.

35. The method of claim 34, further comprising communicate routing rules from a manager to the router for determination of the third VC, wherein the routing rules reflect one or more consideration selected from the group consisting of:
   traffic considerations;
   security considerations; and
   revenue considerations.

36. The method of claim 34, further comprising:
   handling the voice signals and the data signals within the switch/router as asynchronous transfer mode (ATM) frames;
   using either ATM adaptation layer type-2 (AAL-2) or ATM adaptation layer type-1(AAL-1) functionality at the switch to ensure that the voice signals are switched to the first VC on which they were received; and
   using ATM adaptation layer type-5(AAL-5) functionality at the router to route the data signals from the second VC to the third VC.

37. The method of claim 34, further comprising implementing switching and routing within the switch/router using a single switch matrix.

38. A method of communicating voice and data information at a customer premises associated with one or more subscribers, comprising:
   receiving voice signals at a switching system on a first virtual circuit (VC);
   using a switch of the switching system to route the voice signals out of the switching system on the first VC;
   receiving data signals at the switching system;
   communicating the data signals from the switch on a second VC for routing;
   receiving the data signals from the switch at a router of the switching system;
   determining a third VC for the data signals; and
   communicating the data signals from the router to the switch on the third VC for communication out of the switching system on the third VC;
wherein:
   handling the voice signals and the data signals within the switching system as asynchronous transfer mode (ATM) frames;
   using either ATM adaptation layer type-2 (AAL-2) or ATM adaptation layer type 1 (AAL-1) functionality at the switch to ensure that the voice signals are switched to the first VC on which they were received; and
   using ATM adaptation layer type-5 (AAL-5) functionality at the router to route the data signals from the second VC to the third VC.

39. A method of communicating voice and data information at a customer premises associated with one or more subscribers, comprising:
- receiving voice signals at a switching system on a first virtual circuit (VC);
- using a switch of the switching system to route the voice signals out of the switching system on the first VC;
- receiving data signals at the switching system;
- communicating the data signals from the switch on a second VC for routing;
- receiving the data signals from the switch at a router of the switching system;
- determining a third VC for the data signals;
- communicating the data signals from the router to the switch on the third VC for communication out of the switching system on the third VC; and
- implementing the switching and routing using a single switch matrix of the switching system.

40. A method of communicating voice and data information at a customer premises associated with one or more subscribers, comprising:
- receiving voice signals at a switching system on a first virtual circuit (VC);
- using a switch of the switching system to route the voice signals out of the switching system on the first VC;
- receiving data signals at the switching system;
- communicating the data signals from the switch on a second VC for routing;
- receiving the data signals from the switch at a router of the switching system;
- determining a third VC for the data signals;
- communicating the data signals from the router to the switch on the third VC for communication out of the switching system on the third VC; and
- communicating one or more routing rules from a manager to the router for routing of the data signals.

41. The method of claim 40, wherein the routing rules reflect one or more consideration selected from the group consisting of:
- traffic considerations;
- security considerations; and
- revenue considerations.

42. A method of communicating voice and data information at a customer premises associated with one or more subscribers, comprising:
- receiving voice signals at a switching system on a first virtual circuit (VC);
- using a switch of the switching system to route the voice signals out of the switching system on the first VC;
- receiving data signals at the switching system;
- communicating the data signals from the switch on a second VC for routing;
- receiving the data signals from the switch at a router of the switching system;
- determining a third VC for the data signals;
- communicating the data signals from the router to the switch on the third VC for communication out of the switching system on the third VC;
- separating voice signals received from subscribers from data signals received from subscribers using a splitter of the switching system;
- communicating the separated voice and data signals from the splitter;
- receiving the separated voice signals from the splitter at a voice processor;
- using the voice processor to process the voice signals;
- communicating the processed voice signals for routing within the switching system;
- receiving the separated data signals from the splitter at an xDSL processor;
- using the xDSL processor to process the data signals; and
- communicating the processed data signals for routing within the switching system.

43. A method of communicating voice and data information at a customer premises associated with one or more subscribers, comprising:
- receiving voice signals at a switching system on a first virtual circuit (VC);
- using a switch of the switching system to route the voice signals out of the switching system on the first VC;
- receiving data signals at the switching system;
- communicating the data signals from the switch on a second VC for routing;
- receiving the data signals from the switch at a router of the switching system;
- determining a third VC for the data signals;
- communicating the data signals from the router to the switch on the third VC for communication out of the switching system on the third VC; and
- selectively communicating available voice signals from the switching system before available data signals, according to their relative priorities.

44. A method of communicating voice and data information at a customer premises associated with one or more subscribers, comprising:
- receiving voice signals at a switching system on a first virtual circuit (VC);
- using a switch of the switching system to route the voice signals out of the switching system on the first VC;
- receiving data signals at the switching system;
- communicating the data signals from the switch on a second VC for routing;
- receiving the data signals from the switch at a router of the switching system;
- determining a third VC for the data signals;
- communicating the data signals from the router to the switch on the third VC for communication out of the switching system on the third VC;
- receiving, using an interface of the switching system, remote voice signals and remote data signals from a second switching system at the customer premises;
- receiving local voice signals and local data signals at the interface from the switch;
- selectively communicating from the interface the available signal having the highest priority, wherein:
- remote voice signals have the highest priority;
- local voice signals have the second highest priority; and
- data signals have the third highest priority.

45. The method of claim 44, wherein remote data signals have the third highest priority and local data signals have the fourth highest priority.

46. A method of communicating voice and data information at a customer premises associated with one or more subscribers, comprising:

receiving voice signals at a switching system on a first virtual circuit (VC);

using a switch of the switching system to route the voice signals out of the switching system on the first VC;

receiving data signals at the switching system;

communicating the data signals from the switch on a second VC for routing;

receiving the data signals from the switch at a router of the switching system;

determining a third VC for the data signals;

communicating the data signals from the router to the switch on the third VC for communication out of the switching system on the third VC; and using an interface of the switching system and one or more stack links to couple the switching system to one or more other switching systems at the customer premises in a stackable configuration, such that the switching systems function as a single logical unit in communicating information associated with the subscribers.

* * * * *